(12) United States Patent
Lee

(10) Patent No.: US 8,136,518 B2
(45) Date of Patent: Mar. 20, 2012

(54) SUN-TRACKING SOLAR ENERGY COLLECTOR APPARATUS

(75) Inventor: Chang Chi Lee, Fengyuan (TW)

(73) Assignee: Suntop Solar Energy Co., Ltd., Taichung County (TW)

( * ) Notice: Subject to any disclaimer, the term of this patent is extended or adjusted under 35 U.S.C. 154(b) by 340 days.

(21) Appl. No.: 12/647,730

(22) Filed: Dec. 28, 2009

(65) Prior Publication Data

US 2011/0132352 A1    Jun. 9, 2011

(30) Foreign Application Priority Data

Dec. 8, 2009 (TW) .............................. 98222907 U

(51) Int. Cl.
*F24J 2/38* (2006.01)
(52) U.S. Cl. .................... 126/600; 126/605; 126/576
(58) Field of Classification Search ............... 126/573, 126/576, 577, 600, 605, 606, 607
See application file for complete search history.

(56) References Cited

U.S. PATENT DOCUMENTS

| 6,058,930 A | * | 5/2000 | Shingleton | 126/600 |
| 7,240,674 B2 | * | 7/2007 | Patterson | 126/573 |
| 7,554,030 B2 | * | 6/2009 | Shingleton | 136/246 |

* cited by examiner

*Primary Examiner* — Alfred Basichas
(74) *Attorney, Agent, or Firm* — Ming Chow; Sinorica, LLC

(57) ABSTRACT

A sun-tracking solar energy collector apparatus includes an east-west driving shaft body and a south-north driving shaft body which are coupled in the shape of a cross. A first driving member of an east-west shaft sleeve of the east-west driving shaft body is actuated to turn the south-north driving shaft body in an east-west direction. A second driving member of the south-north driving shaft body is driven by the first driving member to turn an east-west driving shaft of the east-west driving shaft body in a south-north direction and to drive an annular member which is connected with the ends of the east-west driving shaft, such that a holding rack assembly connected with the annular member is actuated in east-west and south-north directions. Solar energy collector modules of the holding rack assembly can track to collect solar energy. Due to the base body in cooperation with the effect of tracking sun, the area occupied by the base body is larger. Thus, the surroundings of the base body can be adapted for parking, charging of a motor-driven vehicle and the like, enhancing its total generating capacity and providing better usage.

10 Claims, 14 Drawing Sheets

SUN-TRACKING SOLAR ENERGY COLLECTOR APPARATUS

BACKGROUND OF THE INVENTION

1. Field of the Invention

The present invention relates to a sun-tracking solar energy collector apparatus, in particular to a sun-tracking apparatus capable of automatically changing the angle of solar energy collector modules so as to collect the sun light directly and efficiently.

2. Description of the Prior Art

Following the development and change of human civilization, the consumption of energy sources is increasingly great. However, the energy sources, such as petroleum, natural gas, coal, and so on, may be used up some day. Besides, the greenhouse effect becomes a big problem because the concentration of carbon dioxide gradually increases. The climate of the earth is extraordinary changing. Thus, energy-saving and carbon reduction is a worldwide plan. Solar energy is the greatest natural energy of the earth. The energy of the sunlight to the ground every day is a quarter of the global petroleum reserves. The solar energy does not pollute the environment. Furthermore, the semiconductor materials are developed rapidly, so the collection of the solar energy is improved. Because the radiation of the solar energy is in a distributed way, the intensity of the light is low, not more than 1,000 watt/square meter. A conventional solar energy collector apparatus comprises a pillar and a solar energy collector module which is obliquely connected to the pillar. There are some shortcomings in the prior art:

1. Low generating capacity: the solar energy collector module is obliquely connected to the pillar, which is unable to collect the solar energy effectively because the change of the incidence of the sunlight.

2. Insufficient functionality of usage: the solar energy collector module is obliquely connected to the pillar. When the incidence of the sunlight is changed, the solar energy collector module is unable to change its angle relative to the pillar accordingly. Besides, the solar energy collector module is only adapted to collect the solar energy, without any other additional functions.

SUMMARY OF THE INVENTION

In view of the above-mentioned problems, the present invention is to improve the shortcomings of the conventional solar energy module structure. The present invention is installed and maintained with ease and lowers the PV system cost effectively.

The primary object of the present invention is to provide a sun-tracking solar energy collector apparatus comprises a central cross shaft assembly. The central cross shaft assembly comprises an east-west driving shaft body and a south-north driving shaft body which are coupled in the shape of a cross. The central cross shaft assembly is disposed in a base body. An east-west driving shaft is pivoted in an east-west shaft sleeve. Two ends of the east-west driving shaft body are movably inserted in limits holes of the base body. Two ends of the south-north driving shaft body are pivotally connected to pivot holes of the base body. One end of the first driving member is pivotally connected to the east-west shaft sleeve, and the other end of the first driving member is pivotally connected to a coupling seat of the base body. One end of the second driving member is pivotally connected to a side edge of the south-north driving shaft body, and the other of the second driving member is pivotally connected to the coupling holder of the east-west driving shaft. A pair of ledges of an annular member of a cable-stayed coupling frame is connected with the two ends of the east-west driving shaft extending out from the limit holes of the base body. Oblique round pipes are pivotally connected to an outer side of the annular member in the shape of a cross. A cable-stayed truss is coupled to a top surface of the annular member. A top end of the cable-stayed truss is connected with cables. The other ends of the cables are coupled to outer ends of the oblique round pipes. Racks are aligned and longitudinally coupled on main beams of a holding rack assembly. Solar energy collector modules are aligned and coupled on the racks. The solar energy collector modules and the racks have an angle in the range from 0 degree to 50 degrees. The main beams have bottom surfaces connected with the oblique round pipes of the cable-stayed coupling frame. Coupling posts of the racks are connected with the top surface of the annular member of the cable-stayed coupling frame. The first driving member of the east-west shaft sleeve of the east-west driving shaft body is actuated to turn the south-north driving shaft body in an east-west direction. The second driving member of the south-north driving shaft body is driven by the first driving member to turn the east-west driving shaft of the east-west driving shaft body in a south-north direction and to drive the annular member connected with the ends of the east-west driving shaft, such that the holding rack assembly connected with the annular member is actuated in east-west and south-north directions. The solar energy collector modules of the holding rack assembly can track sun to collect sunlight. Due to the base body in cooperation with the effect of sun-tracking, the area occupied by the base body is larger. Thus, the surroundings of the base body can be adapted for parking, charging of a motor-driven vehicle and the like, enhancing its generating capacity and providing better usage.

DETAILED DESCRIPTION OF THE PREFERRED EMBODIMENTS

Figure 1:
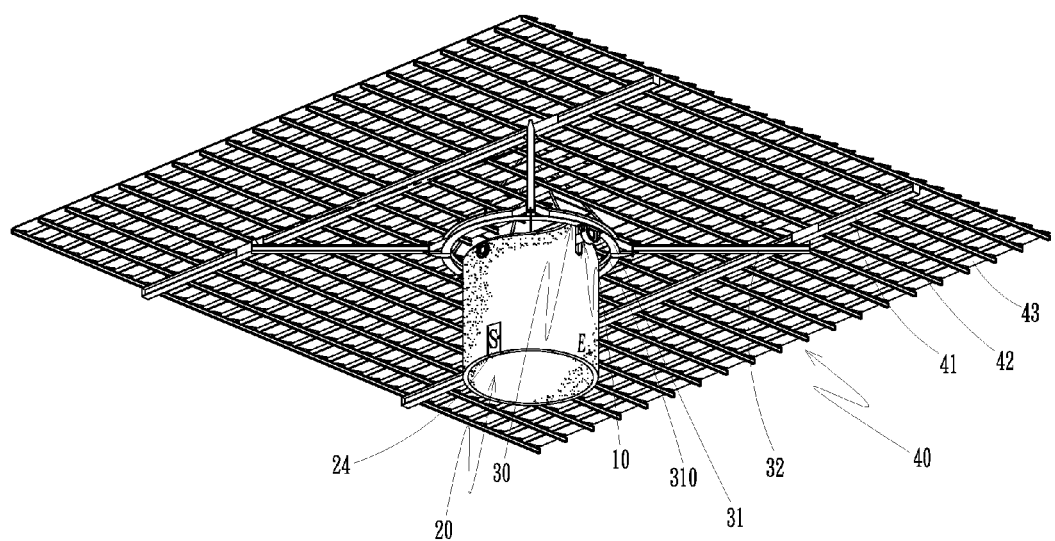
FIG. 1 is a perspective view of the present invention.

Embodiments of the present invention will now be described, by way of example only, with reference to the accompanying drawings.

As shown in FIG. 1 to FIG. 5, a sun-tracking solar energy collector apparatus of the present invention comprises a central cross shaft assembly (10), a base body (20), a cable-stayed coupling frame (30), and a holding rack assembly (40).

The central cross shaft assembly (10) comprises an east-west driving shaft body (11), a south-north driving shaft body (12) and bearings (13). The east-west driving shaft body (11) comprises an east-west shaft sleeve (110) and an east-west driving shaft (111). The east-west shaft sleeve (110) is provided with a first driving member (110A). The east-west driving shaft (111) is provided with a coupling holder (111A). The south-north driving shaft body (12) is provided with a second driving member (120). The east-west driving shaft body (11) and the south-north driving shaft body (12) are crisscross connected. The bearings (13) are disposed at two ends of the east-west shaft sleeve (110) of the east-west driving shaft body (11) and at two ends of the south-north driving shaft body (12). The east-west driving shaft (111) is rotatable in the east-west shaft sleeve (110) and pivotally connected with the bearings (13) at the two ends of the east-west shaft sleeve (110). One end of the first driving member (110A) is pivotally connected to a lower edge of the east-west shaft sleeve (110). One end of the second driving member (120) is pivotally connected to a side edge of the south-north driving shaft body (12), and the other end of the second driving member (120) is pivotally connected to an end edge of the coupling holder (111A) of the east-west driving shaft (111).

The base body (20) has pivot holes (21), limit holes (22), a coupling seat (23) and an inlet portion (24). The base body (20) is pivotally connected with the central cross shaft assembly (10). The pivot holes (21) of the base body (20) are adapted to accommodate the bearings (13) at the two ends of the south-north driving shaft body (12) of the central cross shaft assembly (10). Two ends of the east-west driving shaft body (11) of the central cross shaft assembly (10) are movably inserted in the limit holes (22). Another end of the first driving member (110A) of the east-west shaft sleeve (110) of the east-west shaft body (11) is pivotally connected to the coupling seat (23) in the base body (20).

The cable-stayed coupling frame (30) comprises an annular member (31), oblique round pipes (32), a cable-stayed truss (33), and cables (34). The annular member (31) has a pair of ledges (310) at a bottom thereof. An outer end of each of the oblique round pipes (32) is provided with a coupling disc (320). The pair of the ledges (310) of the annular member (31) is connected with the two ends of the east-west driving shaft body (11) of the central cross shaft assembly (10). The oblique round pipes (32) are pivotally connected to an outer side of the annular member (31) in the shape of a cross. The cable-stayed truss (33) is coupled to a top surface of the annular member (31). One end of each of the cables (34) is coupled to a top end of the cable-stayed truss (33), and the other end of each of the cables (34) is coupled to the outer end of the oblique round pipe (32).

The holding rack assembly (40) comprises main beams (41), racks (42), and solar energy collector modules (43). The racks (42) are provided with a coupling post (420), respectively. The racks (42) are aligned and longitudinally coupled on the main beams (41). The solar energy collector modules (43) are aligned and coupled on the racks (42). The solar energy collector modules (43) and the racks (42) have an angle in the range from 0 degree to 50 degrees. The main beams (41) each have a bottom surface which is connected with the coupling disc (320) of the oblique round pipe (32). The coupling post (420) of the rack (42) is connected with the top surface of the annular member (31) of the cable-stayed coupling frame (30).

Referring to FIG. 3 to FIG. 6, the east-west driving shaft body (11) of the central cross shaft assembly (10) is crisscross connected with the south-north driving shaft body (12). The central cross shaft assembly (10) is located in the base body (20). The east-west driving shaft (111) is pivoted in the east-west shaft sleeve (110). The two ends of the east-west driving shaft (111) are movably inserted in the limit holes (22) of the base body (20). The two ends of the south-north driving shaft body (12) are pivotally connected to the pivot holes (21) of the base body (20). One end of the first driving member (110A) is pivotally connected to the east-west shaft sleeve (110), and the other of the first driving member (110A) is pivotally connected to the coupling seat (23) in the base body (20). One end of the second driving member (120) is pivotally connected to the south-north driving shaft body (12), and the other of the second driving member (120) is pivotally connected to the coupling holder (111A) of the east-west driving shaft (111). The pair of ledges (310) of the annular member (31) of the cable-stayed coupling frame (30) is connected with the two ends of the east-west driving shaft (111) extending out from the limit holes (22) of the base body (20). The oblique round pipes (32) are pivotally connected to the outer side of the annular member (31) in the shape of a cross. The cable-stayed truss (33) is coupled to the top surface of the annular member (31). The top end of the cable-stayed truss (33) is connected with the cables (34). The other ends of the cables (34) are coupled to the outer ends of the oblique round pipes (32). The racks (42) are aligned and longitudinally coupled on the main beams (41) of the holding rack assembly (40). The solar energy collector modules (43) are aligned and coupled on the racks (42). The solar energy collector modules (43) and the racks (42) have an angle in the range from 0 degree to 50 degrees. The main beams (41) have the bottom surfaces connected with the oblique round pipes (32) of the cable-stayed coupling frame (30). The coupling posts (420) of the racks (42) are connected with the top surface of the annular member (31) of the cable-stayed coupling frame (30). The first driving member (110A) of the east-west shaft sleeve (110) of the east-west driving shaft body (11) is actuated to turn the south-north driving shaft body (12) in an east-west direction. The second driving member (120) of the south-north driving shaft body (12) is actuated to turn the east-west driving shaft (111) of the east-west driving shaft body (11) in a south-north direction and to drive the annular member (31) connected with the ends of the east-west driving shaft (111). By virtue of the first driving member (110A) cooperate with the second driving member (120), the holding rack assembly (40) connected with the annular member (31) is actuated in east-west and south-north directions.

The solar energy collector modules (43) of the holding rack assembly (40) can track sun to collect solar energy. Due to the base body (20) in cooperation with the effect of tracking sun, the area occupied by the base body (20) is larger. Thus, the surroundings of the base body (20) is adapted for parking, charging of a motor-driven vehicle and the like, enhancing its generating capacity and providing better usage.

Figure 2:
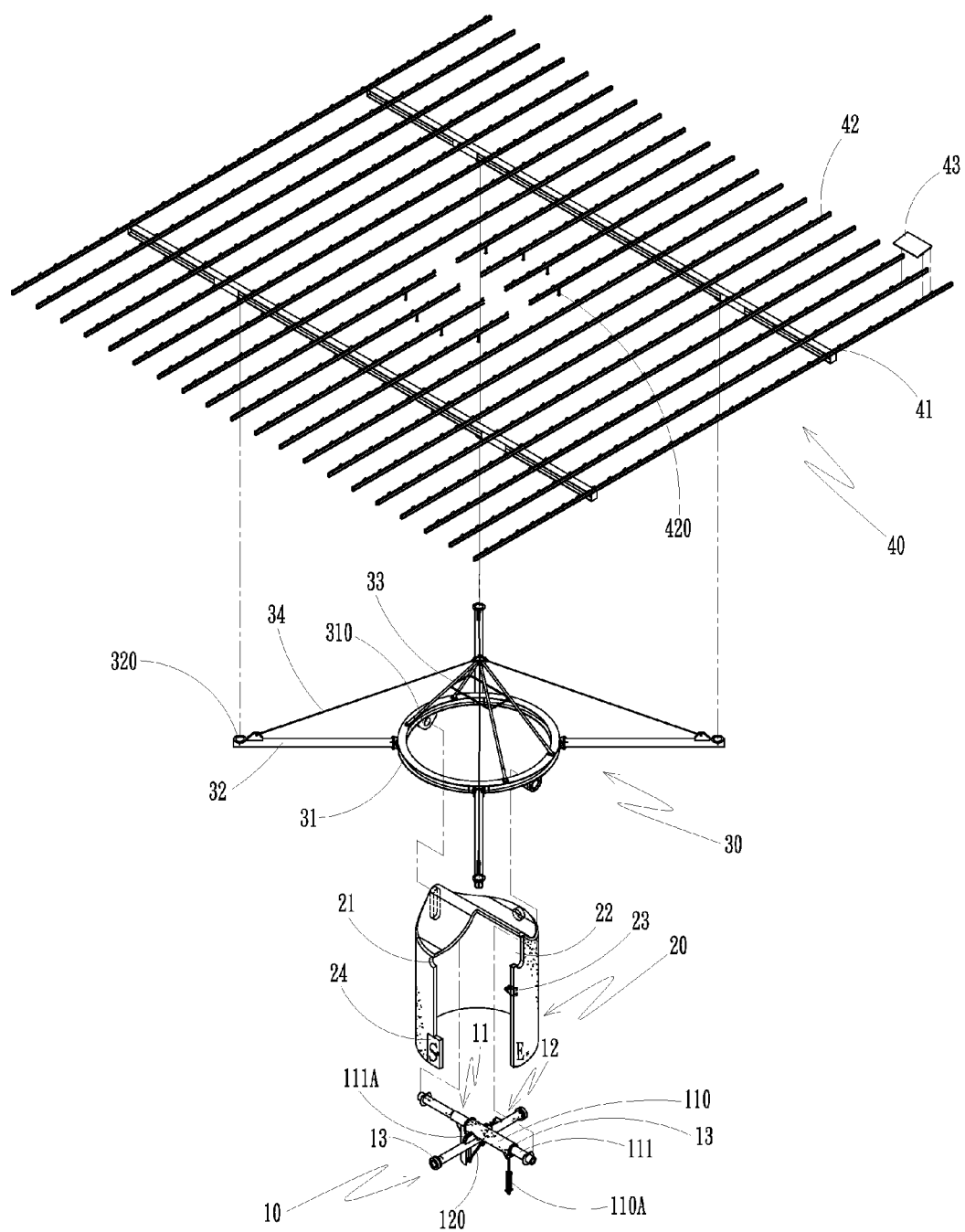
FIG. 2 is an exploded view of the present invention.
Figure 3:
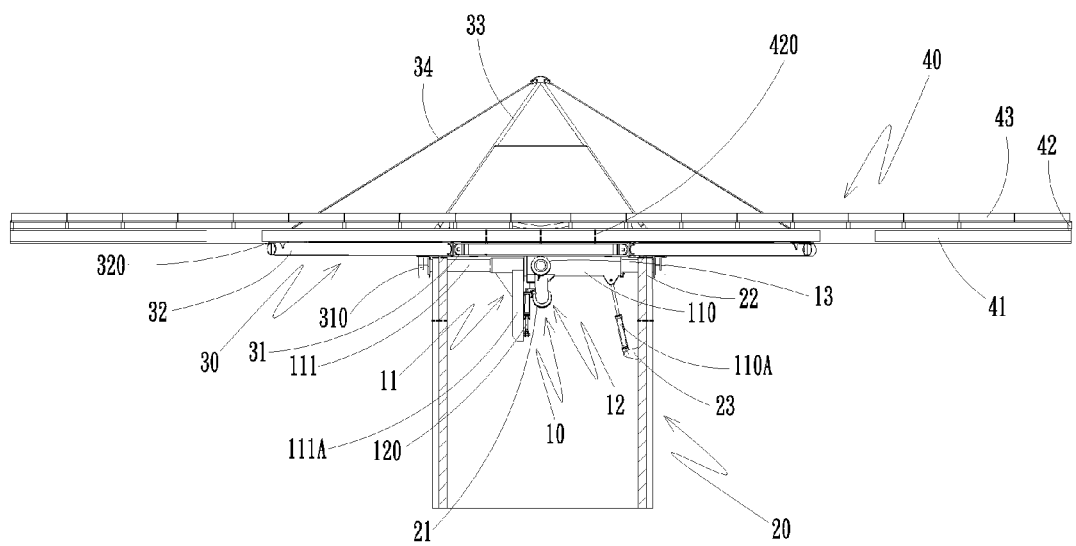
FIG. 3 is a side view of the present invention, partially sectioned.
Figure 4:
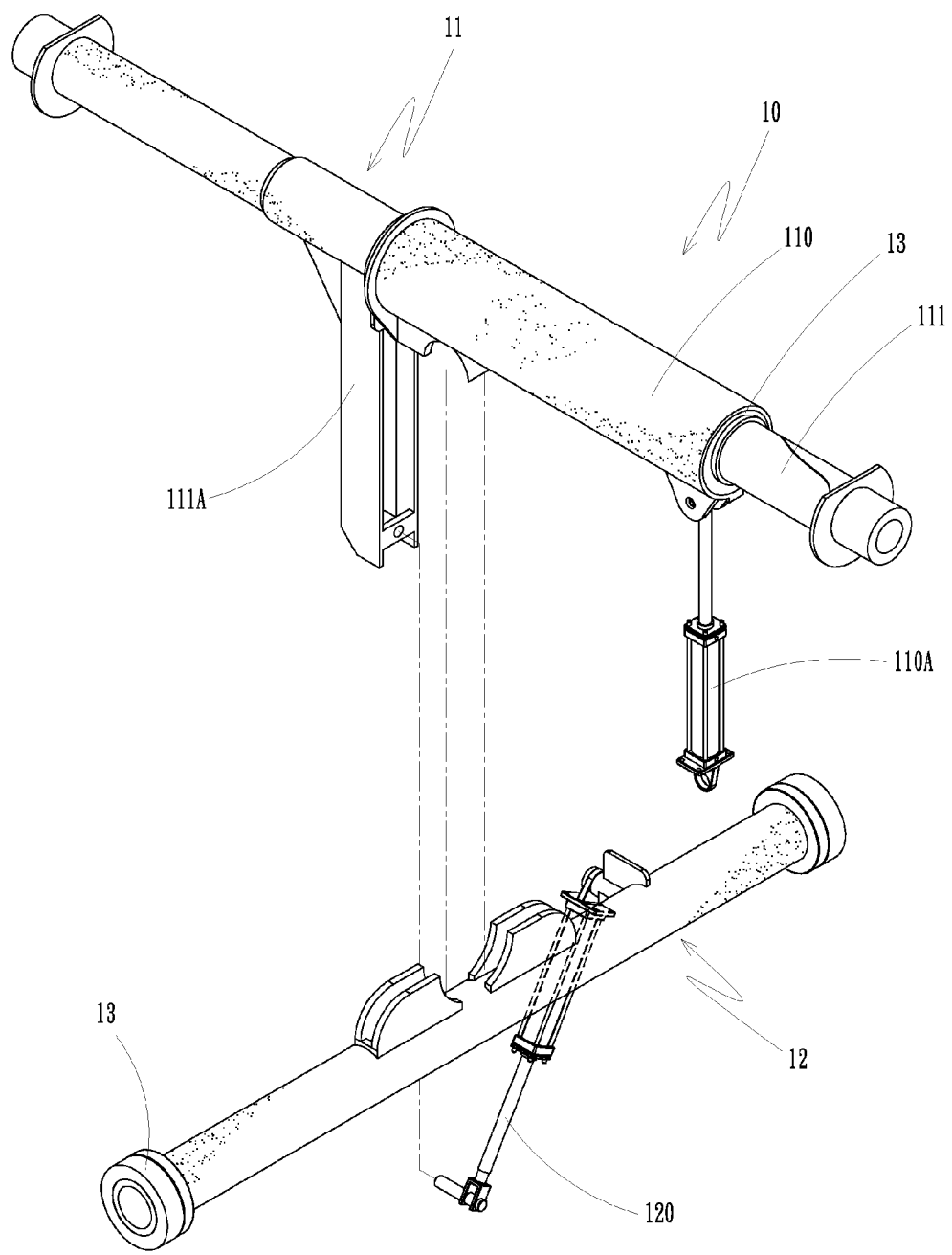
FIG. 4 is an exploded view of the central cross shaft assembly of the present invention.
Figure 5:
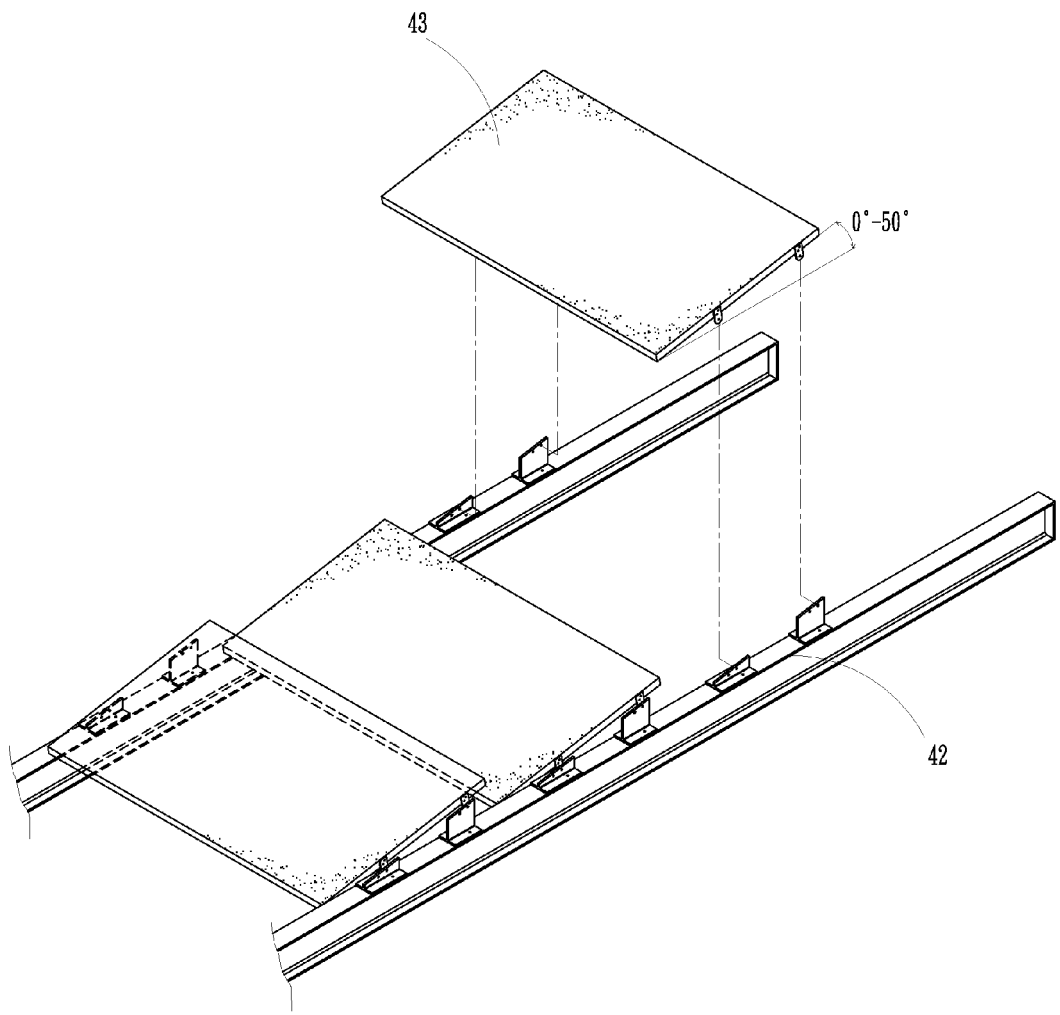
FIG. 5 is an enlarged view showing the solar energy collector modules coupled on the racks of the present invention.
Figure 6:
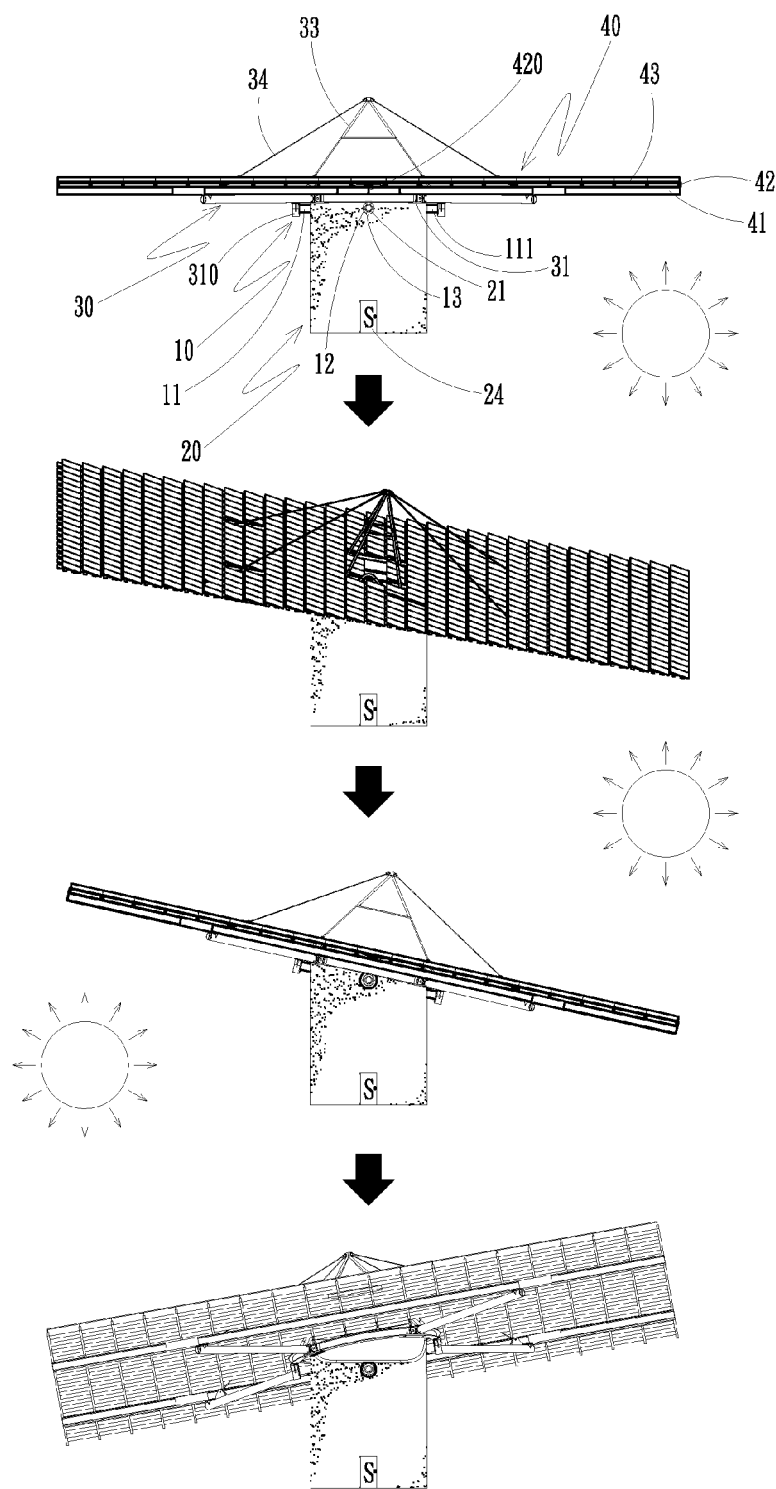
FIG. 6 is a schematic view showing that the cable-stayed coupling frame, the holding rack assembly and the central cross shaft assembly change their inclined direction relative to the base body of the present invention.
Figure 7:
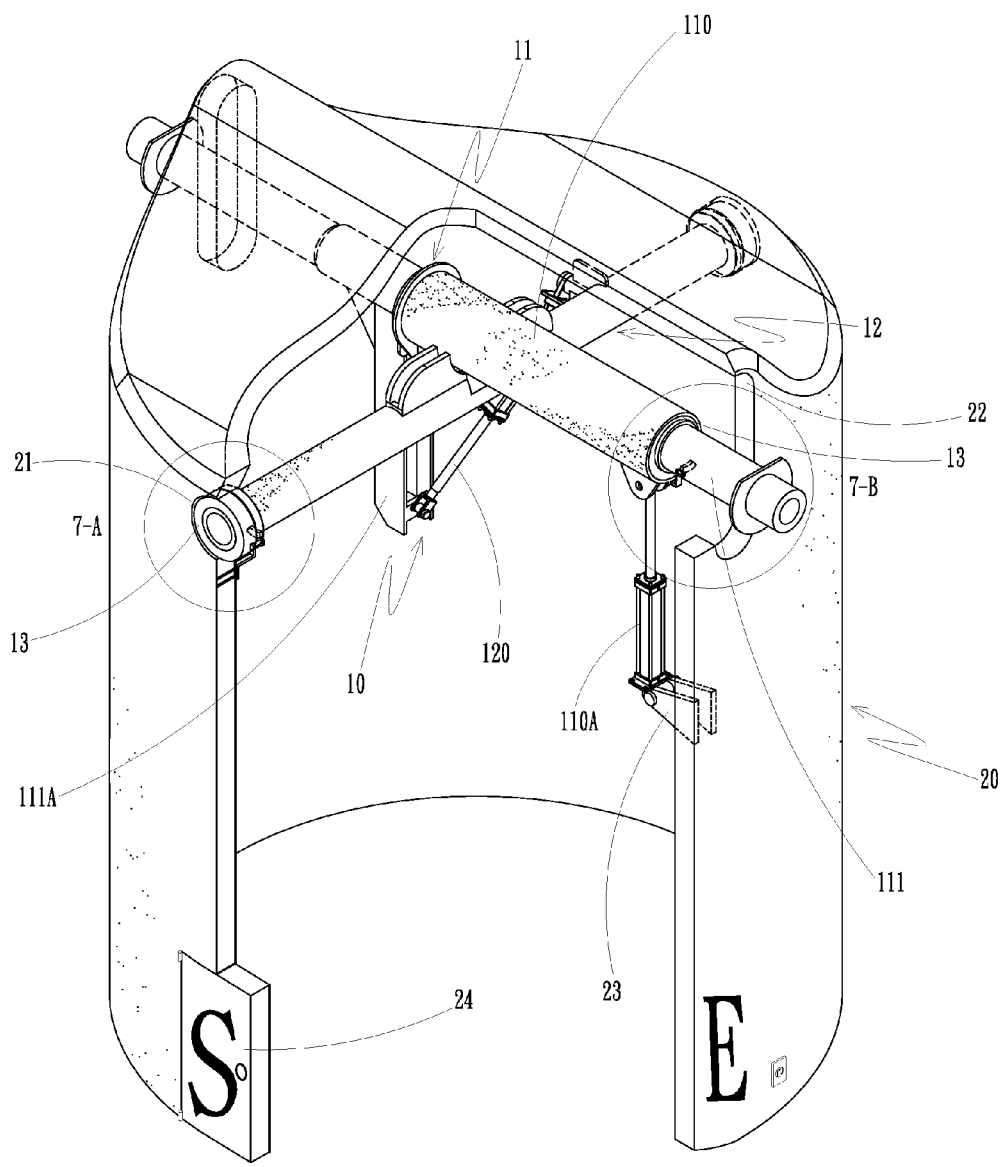
FIG. 7 is a schematic view showing that a first embodiment of the present invention is provided with the first sensor and the second sensor.
Figure 8:
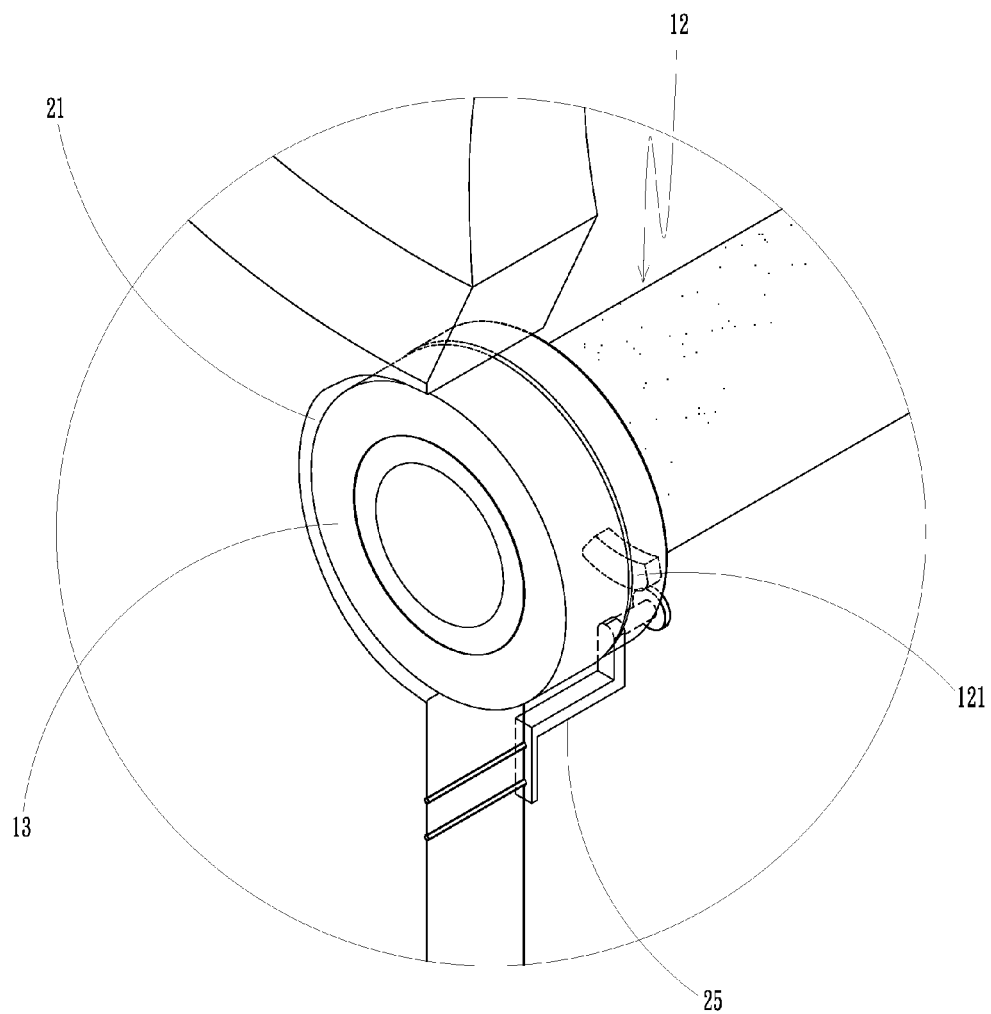
FIG. 8 is an enlarged view of the circle 7-A of FIG. 7 showing that the second sensing block of the south-north driving shaft and the second sensor.
Figure 9:
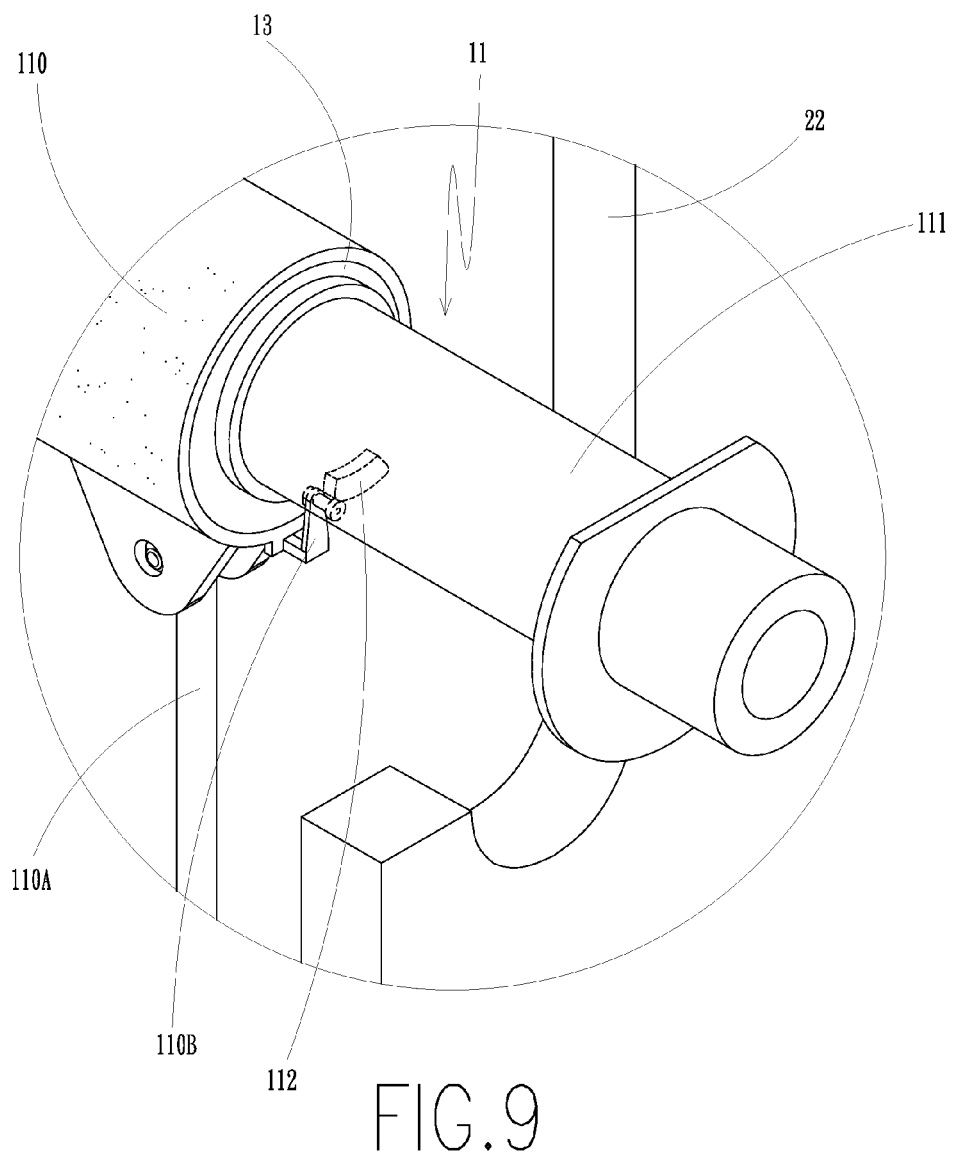
FIG. 9 is an enlarged view of the circle 7-B of FIG. 7 showing that the first sensing block of the east-west driving shaft and the first sensor.
Figure 10:
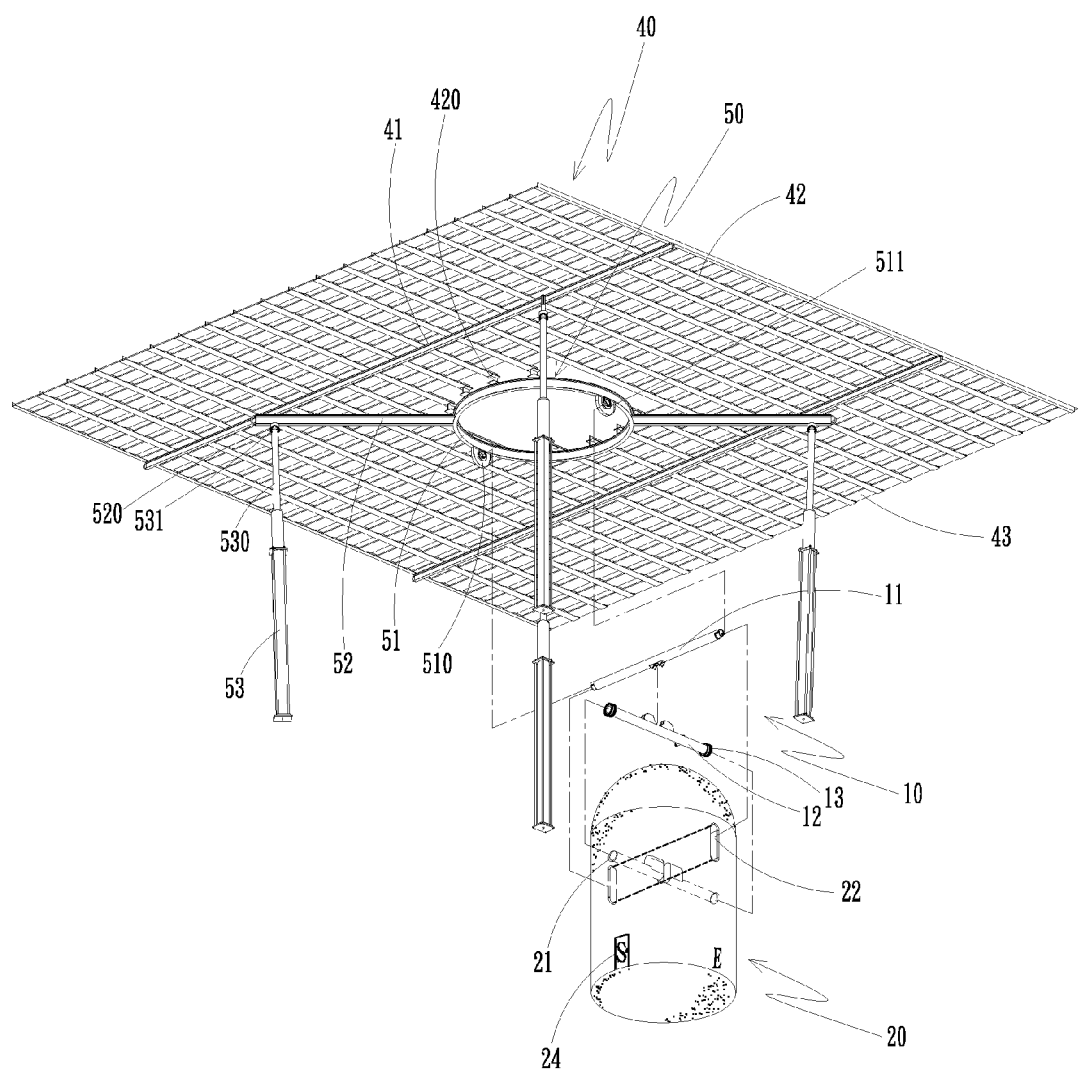
FIG. 10 is an exploded view of a second embodiment of the present invention.
Figure 11:
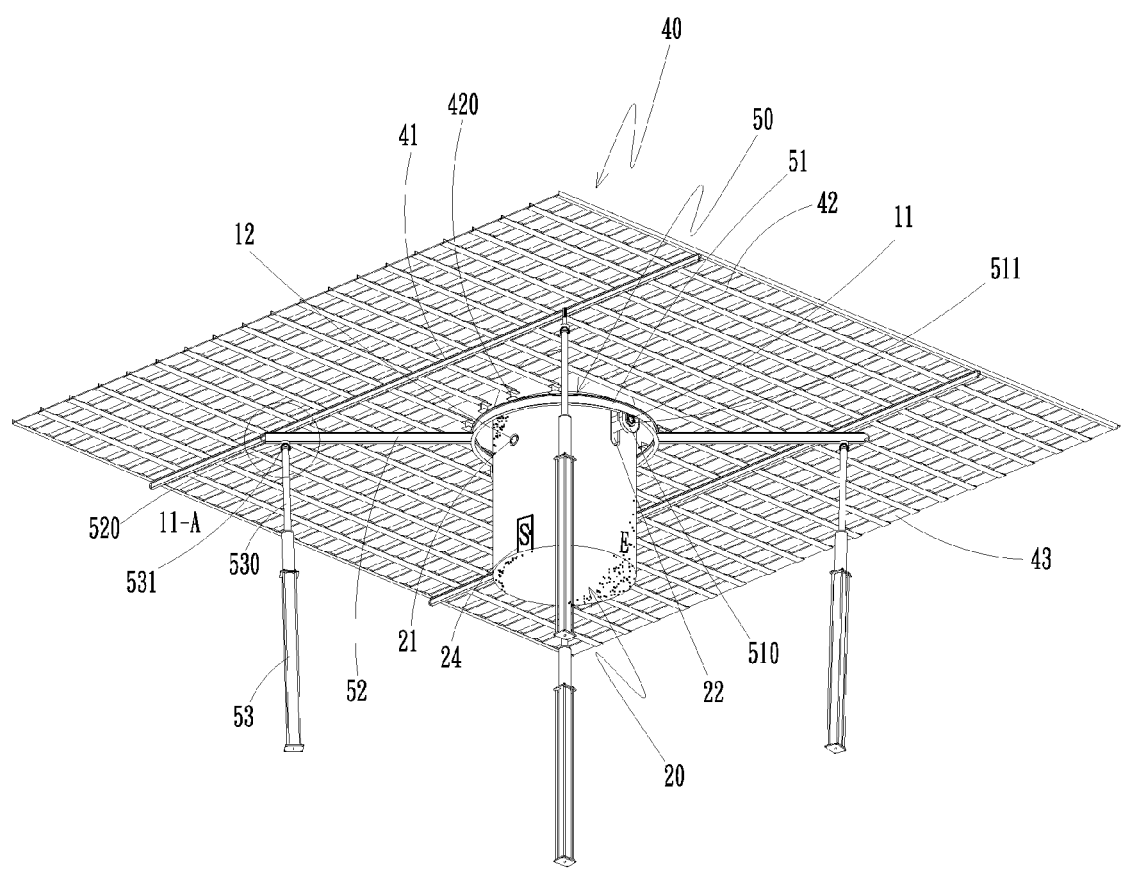
FIG. 11 is an assembled view of the second embodiment of the present invention.
Figure 12:
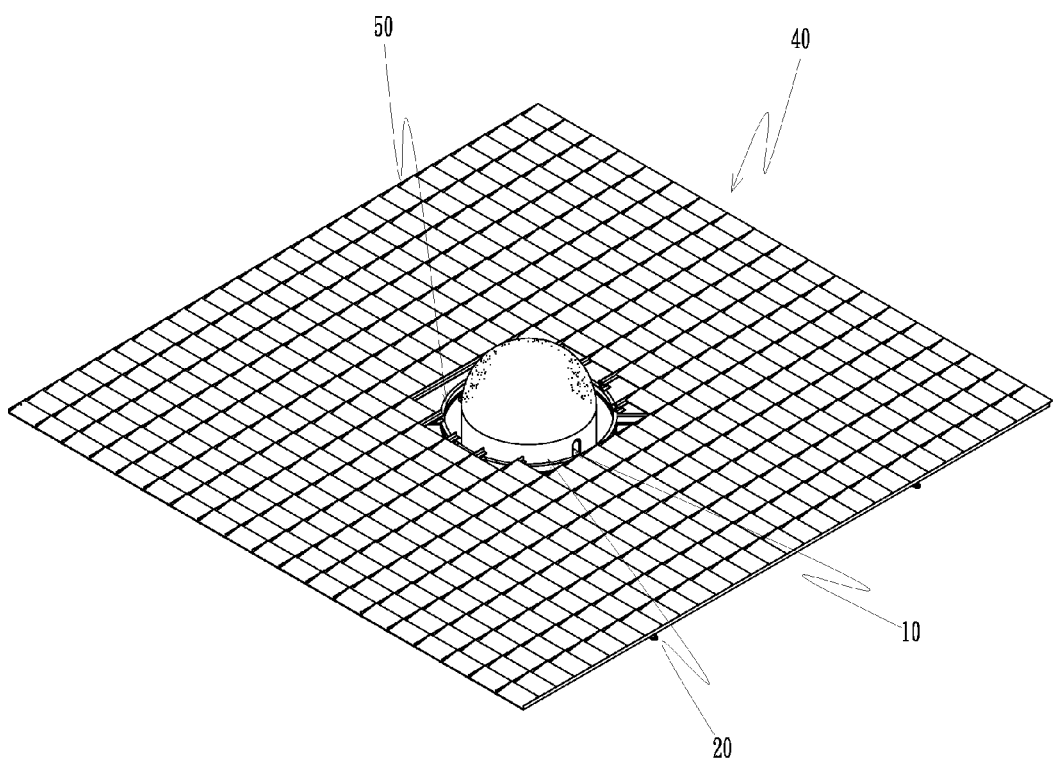
FIG. 12 is a top view of the second embodiment of the present invention.
Figure 13:
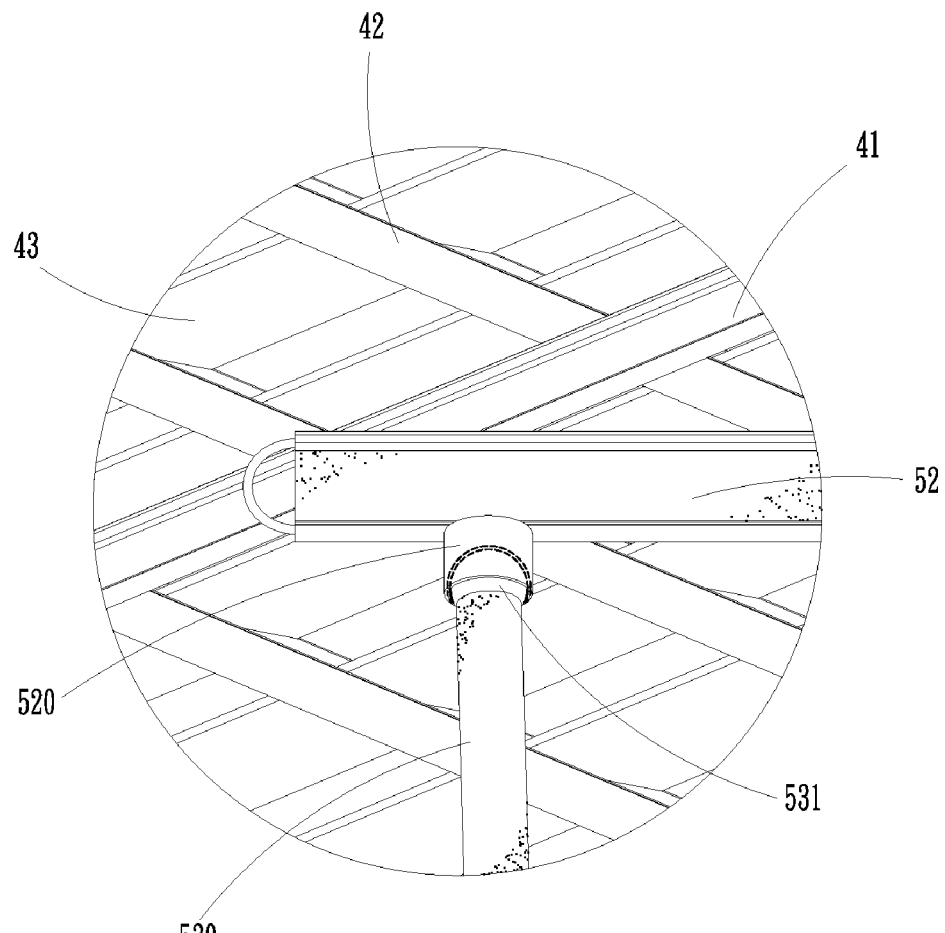
FIG. 13 is an enlarged view of the circle 11-A of FIG. 11 showing that the spherical head of the driving rod of the driving member is movably inserted in the sphere seat of the beam.
Figure 14:
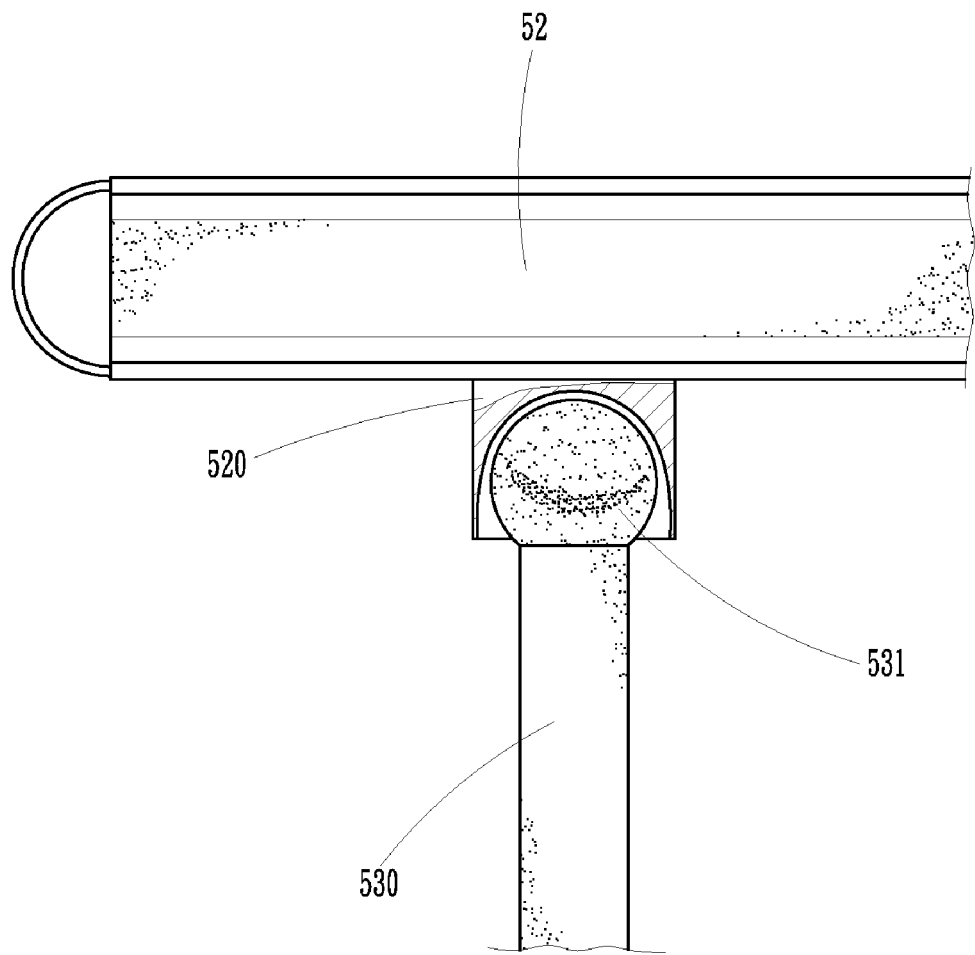
FIG. 14 is a sectional view showing that the spherical head of the driving rod of the driving member is movably inserted in the sphere seat of the beam.

As shown in FIG. 7 to FIG. 9, the sun-tracking solar energy collector apparatus according to a first embodiment of the present invention is substantially similar to that in FIG. 1 to FIG. 3, with the exceptions described hereinafter. A second sensor (25) is provided close to one of the pivot holes (21) of the base body (20). One side of the south-north driving shaft body (12) of the central cross shaft assembly (10) is provided with a second sensing block (121). The second sensing block (121) is located corresponding to the second sensor (25) of the base body (20). The east-west shaft sleeve (110) of the east-west driving shaft body (11) is provided with a first sensor (110B). The east-west driving shaft (111) of the east-west driving shaft body (11) of the central cross shaft assembly (10) is provided with a first sensing bock (112). The first sensing bock (112) is located corresponding to the first sensor (110B) of the east-west shaft sleeve (110) of the east-west driving shaft body (11). When the east-west driving shaft body (11) and the south-north driving shaft body (12) of the central cross shaft assembly (10) are actuated, the first sensor (110B) and the second sensor (25) and the first and second sensing blocks (112), (121) will sense change of angle and send the sensing information to a control device (not shown in the drawings) for monitoring and data record. This provides another practicability of the present invention.

As shown in FIG. 10 to FIG. 14, the sun-tracking solar energy collector apparatus according to a second embodiment of the present invention comprises a central cross shaft assembly (10), a base body (20), a coupling frame (50), and a holding rack assembly (40).

The central cross shaft assembly (10) comprises an east-west driving shaft body (11), a south-north driving shaft body (12) and bearings (13). Two ends of the south-north driving shaft body (12) are pivotally connected with the bearings (13). The east-west driving shaft body (11) and the south-north driving shaft body (12) are crisscross connected.

The base body (20) has pivot holes (21), limit holes (22), and an inlet portion (24). The pivot holes (21) are adapted to accommodate the bearings (13) at the two ends of the south-north driving shaft body (12) of the central cross shaft assembly (10). Two ends of the east-west driving shaft body (11) of the central cross shaft assembly (10) are movably inserted in the limit holes (22).

The coupling frame (50) comprises an annular member (51), oblique beams (52), and driving members (53). The annular member (51) has a pair of ledges (510) at a bottom thereof. The ledges (510) have pivot washers (511) therein. An outer end of each of the oblique beams (52) is provided with a sphere seat (520). The driving member (53) includes a driving rod (530). The driving rod (530) has a movable spherical head (531) at an upper end thereof. The oblique beams (52) are pivotally connected to an outer side of the annular member (51) in the shape of a cross. The pivot washers (511) in the pair of the ledges (510) of the annular member (51) are connected with the two ends of the east-west driving shaft body (11) of the central cross shaft assembly (10). The movable spherical head (531) of the driving rod (530) of each driving member (53) is movably inserted in the sphere seat (520) of the oblique beam (52). The sphere seat (520) has an opening greater than the radius of the movable spherical head (531) of the driving rod (530) of the driving member (53).

The holding rack assembly (40) comprises main beams (41), racks (42), and solar energy collector modules (43). The racks (42) are provided with a coupling post (420), respectively. The racks (42) are aligned and coupled on the main beams (41). The solar energy collector modules (43) are aligned and coupled on the racks (42). The solar energy collector modules (43) and the racks (42) have an angle in the range from 0 degree to 50 degrees. The main beams (41) each have a bottom surface which is connected with the oblique beams (52) of the coupling frame (50). The coupling post (420) of the rack (42) is connected with the top surface of the annular member (51) of the coupling frame (50). By moving the driving rod (530) of the driving member (53) up and down, the movable spherical head (531) of the driving rod (530) is rotatable in the sphere seat (520) of the oblique beam (52) which is connected with the annular member (51), and the annular member (51) of the coupling frame (50) drives the central cross shaft assembly (10) and the holding rack assembly (40). This structure provides another practicability of the present invention.

The advantages of the present invention are as follows:

1. Enhancing its total generating capacity: the central cross shaft assembly can be tilted in east-west and south-north directions to drive the annular member of the cable-stayed coupling frame which is connected with the ends of the east-west driving shaft. The holding rack assembly connected with the annular member is linked to tilt, so that the solar energy collector modules can track sun to collect solar energy. Thus, the amount of collecting the solar energy is increased to enhance its total generating capacity.

2. Providing better usage: the annular member, the cable-stayed truss, the cables and the oblique round pipes of the cable-stayed coupling are able to balance the cable-stayed coupling frame and the holding rack assembly and to enhance their bending strength. Due to the base body in cooperation with the effect of tracking sun, the area occupied by the base body is larger. Thus, the surroundings of the base body is adapted for parking, charging of a motor-driven vehicle and the like, providing better usage Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A sun-tracking solar energy collector apparatus, comprising:
a central cross shaft assembly, the central cross shaft assembly comprising an east-west driving shaft body, a south-north driving shaft body and bearings, two ends of the south-north driving shaft body being pivotally connected with the bearings respectively, the east-west driving shaft body and the south-north driving shaft body being crisscross connected;
a base body, the base body having pivot holes, limit holes and an inlet portion, the pivot holes being adapted to accommodate the bearings at the two ends of the south-north driving shaft body of the central cross shaft assembly, two ends of the east-west driving shaft body of the central cross shaft assembly being movably inserted in the limit holes;
a coupling frame, the coupling frame comprising an annular member, oblique beams and driving members, the annular member having a pair of ledges at a bottom thereof, the ledges having pivot washers therein, an outer end of each of the oblique beams being provided with a sphere seat, the driving members each including a driving rod, the driving rod having a movable spherical head at an upper end thereof, the pivot washers in the pair of the ledges of the annular member being connected with the two ends of the east-west driving shaft body of the central cross shaft assembly, the oblique beams being connected with the annular member, the movable spherical head of the driving rod of each of the driving members being movably inserted in the sphere seat of the oblique beam; and a holding rack assembly, the holding rack assembly comprising main beams, racks and solar energy collector modules, the racks being provided with a coupling post, respectively, the racks being aligned and coupled on the main beams, the solar energy collector modules being aligned and coupled on the racks, the main beams each having a bottom surface connected with the oblique beams of the coupling frame.

2. The sun-tracking solar energy collector apparatus as claimed in claim 1, wherein the oblique beams of the coupling frame are pivotally connected to an outer side of the annular member of the coupling frame in the shape of a cross.

3. The sun-tracking solar energy collector apparatus as claimed in claim 1, wherein the racks of the holding rack assembly are provided with a coupling post, respectively, and the coupling post is connected with the top surface of the annular member of the coupling frame.

4. The sun-tracking solar energy collector apparatus as claimed in claim 1, wherein the solar energy collector modules and the racks have an angle in the range from 0 degree to 50 degrees.

5. The sun-tracking solar energy collector apparatus as claimed in claim 1, wherein the sphere seat has an opening greater than the radius of the movable spherical head of the driving rod of the driving member.

6. A sun-tracking solar energy collector apparatus, comprising:

a central cross shaft assembly, the central cross shaft assembly comprising an east-west driving shaft body, a south-north driving shaft body and bearings, the east-west driving shaft body comprising an east-west shaft sleeve and an east-west driving shaft, the east-west shaft sleeve being provided with a first driving member, the east-west driving shaft being provided with a coupling holder, the south-north driving shaft body being provided with a second driving member, the east-west driving shaft body and the south-north driving shaft body being crisscross connected, the bearings being disposed at two ends of the east-west shaft sleeve of the east-west driving shaft body and at two ends of the south-north driving shaft body, the east-west driving shaft being rotatable in the east-west shaft sleeve and pivotally connected with the bearings at the two ends of the east-west shaft sleeve, one end of the first driving member being pivotally connected to a lower edge of the east-west shaft sleeve, one end of the second driving member being pivotally connected to a side edge of the south-north driving shaft body and another end of the second driving member being pivotally connected to an end edge of the coupling holder of the east-west driving shaft;

a base body, the base body having pivot holes, limit holes, a coupling seat and an inlet portion, the base body being pivotally connected with the central cross shaft assembly, the pivot holes of the base body being adapted to accommodate the bearings at the two ends of the south-north driving shaft body of the central cross shaft assembly, two ends of the east-west driving shaft body of the central cross shaft assembly being movably inserted in the limit holes, another end of the first driving member of the east-west shaft sleeve of the east-west shaft body being pivotally connected to the coupling seat in the base body;

a cable-stayed coupling frame, the cable-stayed coupling frame comprising an annular member, oblique round pipes, a cable-stayed truss and cables, the annular member having a pair of ledges at a bottom thereof, an outer end of each of the oblique round pipes being provided with a coupling disc, the pair of the ledges of the annular member being connected with the two ends of the east-west driving shaft body of the central cross shaft assembly, the oblique round pipes, the cable-stayed truss and the cables being connected with the annular member; and a holding rack assembly, the holding rack assembly comprising main beams, racks and solar energy collector modules, the racks each being provided with a coupling post, the racks being aligned and longitudinally coupled on the main beams, the solar energy collector modules being aligned and coupled on the racks, the main beams each having a bottom surface connected with the coupling disc of each of the oblique round pipes of the cable-stayed coupling frame.

7. The sun-tracking solar energy collector apparatus as claimed in claim 6, wherein the oblique round pipes of the cable-stayed coupling frame are pivotally connected to an outer side of the annular member of the cable-stayed coupling frame in the shape of a cross, the cable-stayed truss is coupled to a top surface of the annular member, one end of each of the cables is coupled to a top end of the cable-stayed truss, and another end of each of the cables is coupled to the outer end of the oblique round pipe.

8. The sun-tracking solar energy collector apparatus as claimed in claim 6, wherein the racks of the holding rack assembly are provided with a coupling post, respectively, and the coupling post is connected with the top surface of the annular member of the cable-stayed coupling frame.

9. The sun-tracking solar energy collector apparatus as claimed in claim 6, wherein the solar energy collector modules and the racks have an angle in the range from 0 degree to 50 degrees.

10. The sun-tracking solar energy collector apparatus as claimed in claim 6, wherein a second sensor is provided close to one of the pivot holes of the base body, one side of the south-north driving shaft body of the central cross shaft assembly is provided with a second sensing block, the second sensing block is located corresponding to the second sensor of the base body, the east-west shaft sleeve of the east-west driving shaft body is provided with a first sensor, the east-west driving shaft of the east-west driving shaft body of the central cross shaft assembly is provided with a first sensing bock, and the first sensing bock is located corresponding to the first sensor of the east-west shaft sleeve of the east-west driving shaft body.

* * * * *